United States Patent
Greyshock

(10) Patent No.: US 8,461,711 B2
(45) Date of Patent: Jun. 11, 2013

(54) COUNTER ROTATION SUBSURFACE CURRENT GENERATOR

(76) Inventor: Paul Greyshock, Vero Beach, FL (US)

( * ) Notice: Subject to any disclaimer, the term of this patent is extended or adjusted under 35 U.S.C. 154(b) by 872 days.

(21) Appl. No.: 12/800,689

(22) Filed: Apr. 6, 2009

(65) Prior Publication Data

US 2011/0109091 A1    May 12, 2011

Related U.S. Application Data

(60) Provisional application No. 61/048,551, filed on Apr. 28, 2008.

(51) Int. Cl.
    *F03D 9/00*    (2006.01)
(52) U.S. Cl.
    USPC ............................................ 290/54; 310/115
(58) Field of Classification Search
    USPC   310/115; 290/43, 54; 415/3.1, 210.1; 416/85
    See application file for complete search history.

(56) References Cited

U.S. PATENT DOCUMENTS

| | | | | |
|---|---|---|---|---|
| 4,039,848 A * | 8/1977 | Winderl | | 290/55 |
| 4,524,285 A * | 6/1985 | Rauch | | 290/43 |
| 5,506,453 A * | 4/1996 | McCombs | | 290/44 |
| 7,102,249 B2 * | 9/2006 | Wobben | | 290/54 |
| 7,329,965 B2 * | 2/2008 | Roberts et al. | | 290/55 |
| 7,397,144 B1 * | 7/2008 | Brostmeyer et al. | | 290/53 |

* cited by examiner

*Primary Examiner* — Dang Le
(74) *Attorney, Agent, or Firm* — Stephen C. Thomas; Hayworth, Chaney & Thomas P.A.

(57) ABSTRACT

An invention for capturing and converting the hydro kinetic energy in ocean and tidal currents into mechanical energy for generating electricity. An internal turbine enclosed in a external turbine cylinder rotates opposite of internal turbine. Current is compressed into high pressure within internal turbine, the high pressure is vented into the rear low pressure side of external turbine producing additional energy. The internal and external turbines are enclosed in a cowling to maximize current through both counter rotating turbines. Permanent magnet rings are coupled to both turbine tips that rotate peripheral to stators. The cowling and turbines are balanced around the main center shaft, it is finned at the rear to steer the apparatus into the current. Counter rotation produces a neutral output torque with increased energy output that is transmitted via underwater cable to onshore grid.

9 Claims, 2 Drawing Sheets

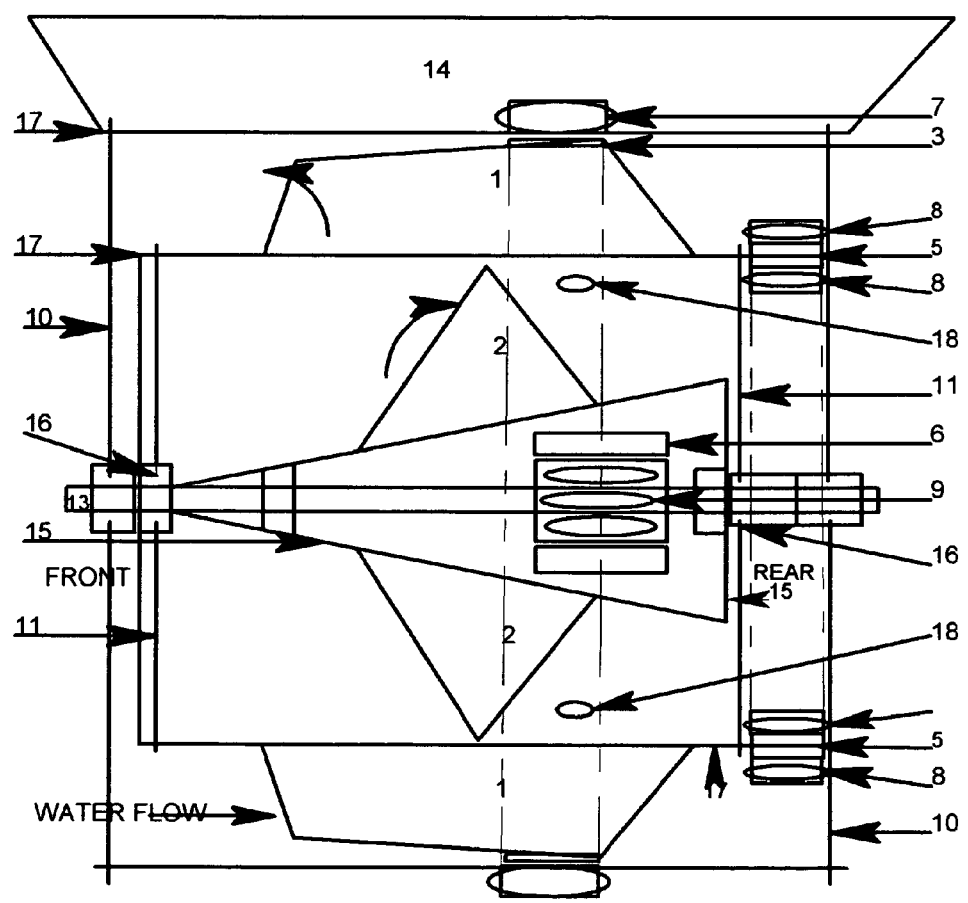

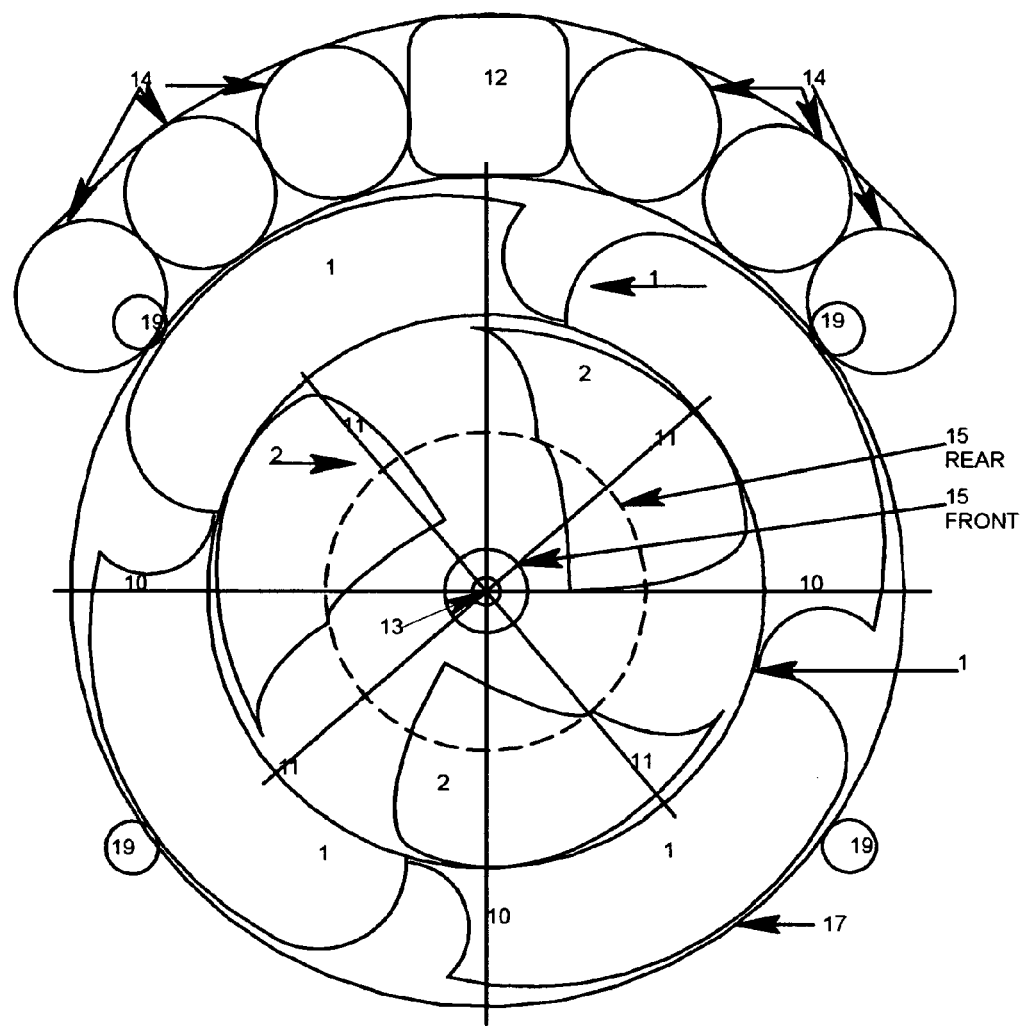
FIG 2 FRONT VIEW

COUNTER ROTATION SUBSURFACE CURRENT GENERATOR

BACKGROUND OF THE INVENTION

The present invention relates to the generation of mechanical power from the renewable power in ocean, tidal and wind currents. It's concept can produce renewable energy in favorable regions where ocean thermal currents flow close to land regions (i.e. the Florida Straits) that would benefit from this untapped resource of energy.

DESCRIPTION OF THE PRIOR ART

There is an increasing need for greater amounts of electrical power, and an increasing concern to minimize pollution of the environment caused by generating electrical power from carbon emitting power stations. Consequently, inventions have been devised for harvesting power from tidal and ocean current. The estimated total worldwide power in ocean currents has been estimated to be about 5,000 GW, with power density up to 75 kW/m2, at deep depths.

The present invention addresses the difficulty in extracting usable portions of this slow moving high-density power in an economical achievable way. This invention is large 5-30 meters in diameter, and operates simple and maintenance free underwater to depths of 200 meters for long periods of service. To work at such depths is difficult to seal and prevent high pressure water from entering the gearbox and generator, resulting in significant kinetic power loss with foreseeable maintenance issues caused from high external pressure of outside water. This invention utilizes constructing the rotor magnetic rings and stators conductors in a series of groups within an open flow generator, this eliminates the need of a sealed gear box and generator, furthermore, this invention affords the generator to stand alone without need of an outside power to induce current for exciter in the event the generator should stall or the current stops, whereto, the current flow powers rotation moving the magnet rings that starts generating electrical energy.

U.S. Pat. No. 868,798, issued on Oct. 22, 1907, to Robert McLaughlin, discloses a means for obtaining power from flowing water, including a screw propeller and a dynamo. The instant invention is distinguishable in that it has two counter rotating turbines.

U.S. Pat. No. 1,123,491, issued on Jan. 5, 1915, to Elbert A. Corbin, discloses a power conversion plant for converting the energy in water currents into electricity, including a screw and generator. The instant invention is distinguishable in that the counter rotating turbines are coupled to the blade tips, that rotate across stator conductors in the open current.

U.S. Pat. No. 2,730,631, issued on Jan. 10, 1956, to Juliana S. Dandini, discloses a water current-driven motor including a generator.

U.S. Pat. No. 3,209,156, issued on Sep. 28, 1965, to Arthur D. Struble, Jr., discloses an impeller driven underwater generator for converting the force of subsurface water currents into electrical energy. The instant invention is distinguishable in that it operates freely anchored in the current and that counter rotation allows for a neutral output torque value that prevent the unit from rotating or turning in the current.

U.S. Pat. No. 3,604,942, issued on Sep. 14, 1971, to Curtis A. Nelson, discloses an underwater generator, having radially extending-arms, each arm pivotally carrying a paddle that can both open and close against water current.

U.S. Pat. No. 3,912,937, issued on Oct. 14, 1975, to Jerome M. Lesser, discloses a submarine electrical energy generating apparatus, having a screw with pivoting louvers. The instant invention is distinguishable from above prior inventions: in that it counter rotates inner and outer screws with fixed magnets, between fixed stator conductors and windings within the apparatus itself.

U.S. Pat. No. 3,928,771, issued on Dec. 23, 1975, to O. Robert Straumsnes, discloses a water current power generator system, including a ship anchored to the bottom, having an inlet and an outlet for water. The instant invention is distinguishable, in that it does not require the constant presence of a ship to generate electricity operating independently.

U.S. Pat. No. 4,026,587, issued on May 31, 1977, to Robert H. Hultman and Dennis C. Hultman, discloses an underwater screw operated by ocean currents with propeller blades outside a housing and a generator inside the housing, The instant invention is distinguishable in that permanent magnets and magnetic coils fixed to counter rotating screw tips generate higher levels of voltage and current in the ocean element, not requiring a generator inside a housing.

U.S. Pat. No. 4,256,970, issued on Mar. 17, 1981, to Osvaldo Tomassini, discloses an apparatus for the exploitation of underwater currents for the production of electrical energy, in which a water driven rotor turns when current flows, causing gears to turn, that cause a shaft in a generator to turn. The instant invention is distinguishable in that it requires no gears to turn a shaft in a generator.

U.S. Pat. No. 4,306,157, issued on Dec. 15, 1981, to Lazar J. Wracsaricht, discloses an underwater slow current turbo generator, having blades extending from a shaft in a spiral pattern, with a cylindrical housing surrounding the blades. The generator may be near and around the shaft, or alternatively in the cylindrical housing (column 7, lines 24-26). The instant invention is distinguishable in that magnet rings are coupled to the counter rotating turbine blades generating emf through the stators, both rotors and stators are built within the apparatus as a generator.

U.S. Pat. No. 4,335,319, issued on Jun. 15, 1982, to John H. Mettersheimer, Jr., discloses a hydroelectric power apparatus utilizing ocean currents, with a power house and crew housing at the surface. The instant invention is distinguishable in that it is self automated and regulated from any surface support vessel.

U.S. Pat. No. 4,464,080, issued on Aug. 7, 1984, to Alexander M. Gorlov, discloses a high volume tidal or current flow harnessing system, including a dam. This is not required in the instant invention.

U.S. Pat. No. 4,520,273, issued on May 28, 1985, to Raymond A. Rowe, discloses a fluid responsive rotor generator, that can be placed on the bottom of the ocean to generate electricity from current flow. Magnets may be placed on the rotor blades, or the blades may themselves be magnetized. Wires are mounted on the framework about the rotor, so that electricity will be generated when the rotor turns. The instant invention is distinguishable, in that the magnetic ring is coupled to turbine blades and bases—turning opposite rotation—peripheral in line to stator conductors and windings at center shaft, mid stator and exterior stator within the exterior cowling that maximizes flow through both counter rotating turbines significantly multiplying energy output.

U.S. Pat. No. 4,524,285, issued on Jun. 18, 1985, to Hans G. Rauch, discloses a hydro-current energy converter, which can be mounted on a platform resting on the sea bed, to generate electricity from ocean currents. A current-driven rotor turns a shaft that turns a generator. The instant invention is distinguishable, in that it counter rotates resulting in a neutral torque value so that the apparatus can be anchored in deep water (600 fathoms) and work in the current generating electricity from the generator within the apparatus.

U.S. Pat. No. 4,720,640, issued on Jan. 19, 1988, to Bjorn M. S. Anderson and Reinhold H. Ziegler, discloses a fluid powered electrical generator, with an impellor-rotor having blades connected at their outward ends by a ring containing the rotor element of a generator, surrounded by a ring-shaped (toroidal) outside support structure containing the stator element of a generator.

The instant invention is distinguishable, in that it counter rotates two internal turbines with rotor magnetic rings (elements) around three stator conductors at: center shaft stator, mid dual stator and, exterior stator enclosed in cowling.

REPRESENTATIONS TO THE CLAIMS

The present invention is an apparatus and method for producing municipally significant quantities of electrical energy from ocean currents without the construction and maintenance challenges found in other designs. In the preferred embodiments, two large-diameter turbines or propellors that resemble auger screws, the inner turbine with magnet rings set within the internal cone rotate a magnetic B field through a stator fixed around the main center shaft. The inner turbine has another magnet ring coupled to the exterior turbine blade tips that move the rotating magnetic B field across the inside of mid stator conductor. Fixed at the base of the external cylinder is a magnet ring outside the mid stator that rotates opposite of the inside magnet ring. This combination configures two magnet rings rotating across the mid dual stator, one inside and, one outside. Last, coupled at the exterior turbine tip blades is another (the largest area and distance) magnet ring rotating around the stator fixed in cowling. All stators are in line opposite to the rotor magnet rings that form groups of generators.

The first preferred embodiment of the invention uses two counter rotating turbines coupled with permanent magnet rings rotating across four stator conductor surfaces. ONE at center shaft (smallest but rotating the fastest). TWO, inside of mid stator, THREE, outside of mid stator. FOUR, the (largest area of diameter and distance long for both rotor and stator) is the exterior magnet ring coupled to the blade tips of exterior turbine rotating the magnet rings across the large distance of stator conductor.

This combination of three generators wound and connected in series in groups steps up voltage for easy transmission of electric current as a single line high voltage direct current via underwater cable to land.

It is another object of the invention to maximize the amount of electricity generated from ocean currents, by generating electricity as directly as possible underwater without seals that create drag and kinetic energy loss from flowing currents.

It is another object of the invention to eliminate several categories of maintenance problems, thus reducing service cost and increasing the reliability of the generator. As a positive buoyant apparatus controlled by internal micro pressure switches that regulate raising and submerging allows the apparatus to be towed to current farm sites, ballast and submerged to optimum depth where current is strongest in flow and density. As current increases there is increased drag on the apparatus to push it deeper, by monitoring and controlling outside pressure keeps apparatus at ideal depth for optimum power production. The apparatus is a propulsion system controlling compressed high and low pressure volumes through internal regulation ports, and internal monitoring or speed and depth pressure to produce maximum conversion of hydro kinetic energy into mechanical energy for production of electricity.

It is a further object of the invention to provide improved elements and arrangements thereof in an apparatus for the purposes described which is inexpensive, dependable and fully effective in accomplishing its intended purposes. All claims and drawings are in the invention name of Counter Rotation Sub Surface Current Generator, in amended; specifications, claims, drawings, representations from prior provisional and non provisional applications.

Claims, description and other objects of the present invention will become understandable upon further review of the following specifications and drawings.

BRIEF DESCRIPTION OF DRAWINGS

The present invention is a method and apparatus for capturing and converting the kinetic energy from flowing currents and producing mechanical energy for producing electricity.

FIG. 1 is a side view of the invention with water current flowing from left to right having two counter rotation turbine's (1) and (2) rotating interior and exterior of each other within cowling (17) that maximizes current through opposite rotating turbines, wherein, the interior turbine cone (15) compresses ocean current into a higher pressure that is released into the low pressure area via regulation ports 18 of exterior turbine chamber (1) generating additional mechanical power to increase electrical energy output.

FIG. 2 is a front view of the invention with the water current flow passing from the front to the rear in equal area's through chamber of exterior turbine tube 1, and interior turbine 2, rotating counter rotation of each other within exterior cowling 17.

DETAILED DESCRIPTION OF THE DRAWINGS

FIG. 1, the generator is viewed with flowing water (current) from left to right passing through the generator, as current enters it is split into equal area by exterior turbine tube 1, where there are four blades (turbines evenly pitched) fabricated front to rear onto exterior side of tube 1 equally spaced 90 degrees around. Interior turbine 2 chamber receives equal water flow through the interior chamber rotating interior turbine 2, comprised of three blades fabricated onto cone 15, equally spaced 120 degrees around. The current is maximized by external cowling 17 that encompass exterior turbine 1 and interior turbine 2. External Cowling 17 is centered by front and rear struts 10, exterior turbine tube 1 is centered by front and rear struts 11, both turbines 1 and 2 and external cowling 17 are centered from center shaft 13. Exterior turbine tube 1 is also braced by four struts front and back 1 (inside struts 10) 90 degrees apart that centers tube 1 from bearings 16 front and back to freely rotate around center shaft 13.

What is claimed is:
1. An improved electric turbine generator, comprising:
a stationary center shaft;
an inner turbine rotationally attached to said center shaft, said inner turbine comprising a cone having an outer surface and coaxially located with respect to said center shaft, and further comprising a plurality of turbine blades disposed on said outer surface of said cone, said turbine blades set at an angle so as to cause said inner turbine to rotate in a first direction when a fluid is passed longitudinally along said inner turbine;

an outer turbine rotationally attached to said center shaft, said outer turbine comprising a substantially cylindrical shape having an outer surface and an inner surface formed by a substantially cylindrical wall, wherein said substantially cylindrical shape is coaxially located with respect to said center shaft and said inner turbine, and further comprising a plurality of turbine blades disposed on said outer surface of said cylindrical shape, said turbine blades set at an angle so as to cause said outer turbine to rotate in a second direction when a fluid is passed longitudinally along the outer surface of said outer turbine;

a stationary exterior cowling comprising a substantially cylindrical shape having an interior surface, wherein said exterior cowling is affixed to at least one cowling support strut which is affixed to said stationary center shaft, and wherein said exterior cowling is coaxially located with respect to said stationary center shaft, said inner turbine, and said outer turbine; and a first electric generator comprising a first stator and a first rotor, wherein said first stator further comprises at least one electrically conductive coil and wherein said first stator is affixed to said center shaft, and wherein said first rotor comprises at least one magnet and wherein said first rotor is affixed to said inner surface of said inner turbine cone, and wherein said first stator and first rotor are located in proximity to one another such that an electric current is generated when said inner turbine rotates.

2. The improved electric generator of claim 1, further comprising a second electric generator comprising a second stator and a second rotor, wherein said second stator further comprises at least one electrically conductive coil and wherein said second stator is affixed to at least one second stator support strut which is affixed said center shaft, and wherein said second rotor comprises at least one magnet and wherein said second rotor is affixed to said outer turbine, and wherein said second stator and second rotor are located in proximity to one another such that an electric current is generated when said outer turbine rotates.

3. The improved electric generator of claim 2, further comprising a third electric generator comprising a third stator and a third rotor, wherein said third stator further comprises at least one electrically conductive coil and wherein said third stator is affixed to said interior surface of said exterior cowling, and wherein said third rotor comprises at least one magnet and wherein said third rotor is affixed to said outer tips of said outer turbine blades, and wherein said third stator and third rotor are located in proximity to one another such that an electric current is generated when said outer turbine rotates.

4. The improved electric generator of claim 3, wherein said first direction of rotation and said second direction of rotation are opposite to one another such that the improved electric generator exhibits neutral torque when a fluid is passed longitudinally along said inner turbine and said outer turbine.

5. The improved electric generator of claim 4, further comprising at least one regulation port in said substantially cylindrical wall of said exterior turbine, said regulation port allowing fluid to pass through said substantially cylindrical wall into the exterior turbine as fluid pressure increases in said inner turbine when fluid is passed longitudinally along said inner turbine and is compressed by said cone.

6. The improved electric generator of claim 2, wherein said first direction of rotation and said second direction of rotation are opposite to one another such that the improved electric generator exhibits neutral torque when a fluid is passed longitudinally along said inner turbine and said outer turbine.

7. The improved electric generator of claim 6, further comprising at least one regulation port in said substantially cylindrical wall of said exterior turbine, said regulation port allowing fluid to pass through said substantially cylindrical wall into the exterior turbine as fluid pressure increases in said inner turbine when fluid is passed longitudinally along said inner turbine and is compressed by said cone.

8. The improved electric generator of claim 1, wherein said first direction of rotation and said second direction of rotation are opposite to one another such that the improved electric generator exhibits neutral torque when a fluid is passed longitudinally along said inner turbine and said outer turbine.

9. The improved electric generator of claim 8, further comprising at least one regulation port in said substantially cylindrical wall of said exterior turbine, said regulation port allowing fluid to pass through said substantially cylindrical wall into the exterior turbine as fluid pressure increases in said inner turbine when fluid is passed longitudinally along said inner turbine and is compressed by said cone.

\* \* \* \* \*